United States Patent
Cai et al.

(10) Patent No.: US 11,493,167 B2
(45) Date of Patent: Nov. 8, 2022

(54) PLANE-DISTRIBUTED LOAD SHARING PRESSURE DEVICE AND USE METHOD THEREOF

(71) Applicant: Fuzhou University, Fuzhou (CN)

(72) Inventors: Yingjie Cai, Fuzhou (CN); Ligang Yao, Fuzhou (CN); Zhiming Xu, Fuzhou (CN); Chaoqian Dong, Fuzhou (CN); Renyi Yang, Fuzhou (CN)

(73) Assignee: FUZHOU UNIVERSITY, Fuzhou (CN)

( * ) Notice: Subject to any disclaimer, the term of this patent is extended or adjusted under 35 U.S.C. 154(b) by 120 days.

(21) Appl. No.: 17/120,794

(22) Filed: Dec. 14, 2020

(65) Prior Publication Data
US 2021/0199236 A1      Jul. 1, 2021

(30) Foreign Application Priority Data

Dec. 31, 2019    (CN) .......................... 201911421466.8

(51) Int. Cl.
*G01N 3/02* (2006.01)
*F16M 11/32* (2006.01)
*F16M 11/20* (2006.01)

(52) U.S. Cl.
CPC ......... *F16M 11/2042* (2013.01); *F16M 11/32* (2013.01); *G01N 3/02* (2013.01)

(58) Field of Classification Search
CPC combination set(s) only.
See application file for complete search history.

(56) References Cited

FOREIGN PATENT DOCUMENTS

EP          0494574 A2 * 12/1991    ....... H01L 21/67121

* cited by examiner

*Primary Examiner* — Brandi N Hopkins
(74) *Attorney, Agent, or Firm* — Notaro, Michalos & Zaccaria P.C.

(57) ABSTRACT

The present disclosure relates to a plane-distributed load sharing pressure device and a use method thereof. The plane-distributed load sharing pressure device includes a first-stage balance rod to an Nth-stage balance rod, N≥2. The middle part of the first-stage balance rod is hinged to a force applying member. The two ends of the first-stage balance rod are respectively perpendicular to and hinged to the middle parts of second-stage balance rods. The two ends of the second-stage balance rod are respectively perpendicular to and hinged to the middle parts of third-stage balance rods. Similarly, the two ends of an (N−1)th-stage balance rod are respectively perpendicular to and hinged to the middle parts of Nth-stage balance rods. Force bearing members used for resolving a force applied by the force applying member to target members are arranged at the two ends of the Nth-stage balance rods.

6 Claims, 2 Drawing Sheets

PLANE-DISTRIBUTED LOAD SHARING PRESSURE DEVICE AND USE METHOD THEREOF

TECHNICAL FIELD

The present disclosure relates to a plane-distributed load sharing pressure device and a use method thereof.

BACKGROUND

In engineering practice, it often needs to bear a force uniformly at a plurality of points on the surface of a workpiece. If an integrated member is used for applying a pressure in a contact manner, it is quite to meet the requirement of uniformly applying the force. In addition, a force applying process is cumbersome, and a force applying effect cannot be effectively ensured. Therefore, it is necessary to provide a plane-distributed load sharing pressure device.

SUMMARY

The objective of the present disclosure is to provide a plane-distributed load sharing pressure device and a use method thereof. The plane-distributed load sharing pressure device is suitable for occasions with a load sharing requirement, and can uniformly resolve a certain concentrated force to target force bearing points.

The technical solution of the present disclosure is that: a plane-distributed load sharing pressure device includes a first-stage balance rod to an Nth-stage balance rod, N≥2. The middle part of the first-stage balance rod is hinged to a force applying member. The two ends of the first-stage balance rod are respectively perpendicular to and hinged to the middle parts of second-stage balance rods. The two ends of the second-stage balance rod are respectively perpendicular to and hinged to the middle parts of third-stage balance rods. Similarly, the two ends of an (N−1)th-stage balance rod are respectively perpendicular to and hinged to the middle parts of Nth-stage balance rods. Force bearing members used for resolving a force applied by the force applying member to target members are arranged at the two ends of the Nth-stage balance rods. Force applying directions of the force bearing members are the same as that of the force applying member.

Further, the first-stage balance rod to the Nth-stage balance rod are separately equal armed levers.

Further, when N=4, the middle part of the first-stage balance rod is hinged to the force applying member which applies a force downward. The two ends of the first-stage balance rod are respectively perpendicular to and hinged to the second-stage balance rods. The two ends of the second-stage balance rod are respectively perpendicular to and hinged to the third-stage balance rods. The two ends of the third-stage balance rod are respectively perpendicular to and hinged to fourth-stage balance rods. The force bearing members are respectively arranged on the lower sides of the two ends of the fourth-stage balance rods.

A use method of a plane-distributed load sharing pressure device includes the following steps:

1) according to the requirement of force bearing points, selecting the number of balance rods;

2) adjusting the lengths of the balance rods of various stages, and the lengths of the balance rods of the same stage may be different;

3) assembling the balance rods into the plane-distributed load sharing pressure device, hinging the middle part of a first-stage balance rod to a force applying member, and mounting force bearing members at the two ends of Nth-stage balance rods, so that the force bearing members act at the force bearing points.

Compared with the prior art, the plane-distributed load sharing pressure device and the use method thereof have the following beneficial effects:

1. The plane-distributed load sharing pressure device is suitable for occasions with a load sharing requirement, may be changed to have unequal arm lengths to realize a special load distribution, and may uniformly resolve a certain concentrated force to target force bearing points.

2. The device is simple in structure, ensures the force bearing uniformity of each force bearing point from the structure, and has a reliable effect. It is neither affected by the deformation of a force applying member itself, nor affected by the unevenness of a plane, so it can ensure that an original concentrated force is uniformly resolved and applied to a plurality of target points.

3. The position distribution of the force bearing points of the device may be diverse. The distribution of the force bearing points may be changed by adjusting the lengths of the balance rods of various stages and the inclination included angles between the levers of various stages to meet different engineering requirements.

Figure 1:
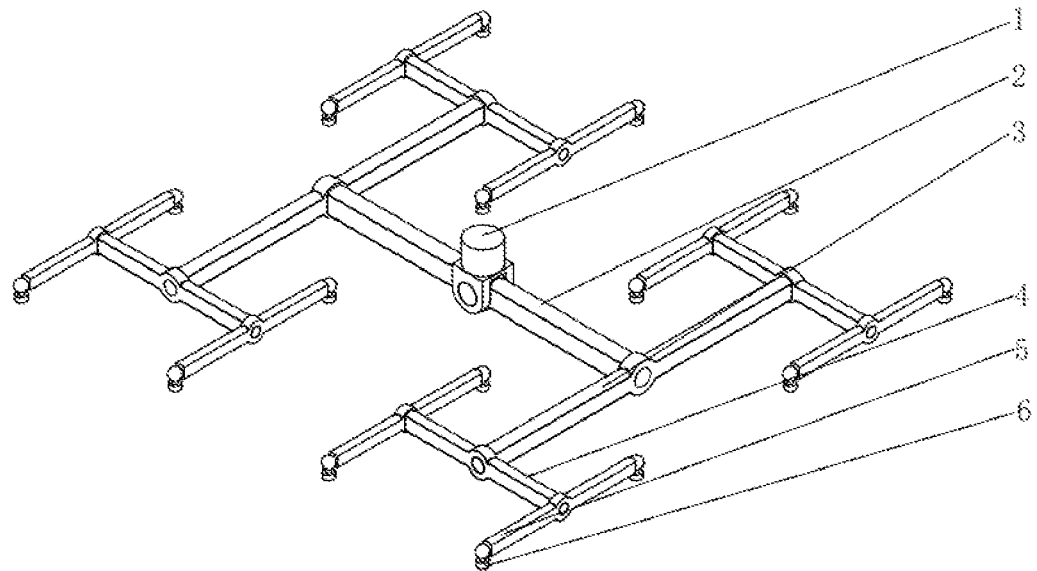
FIG. 1 is a schematic structural diagram of a plane-distributed load sharing pressure device.
Figure 2:
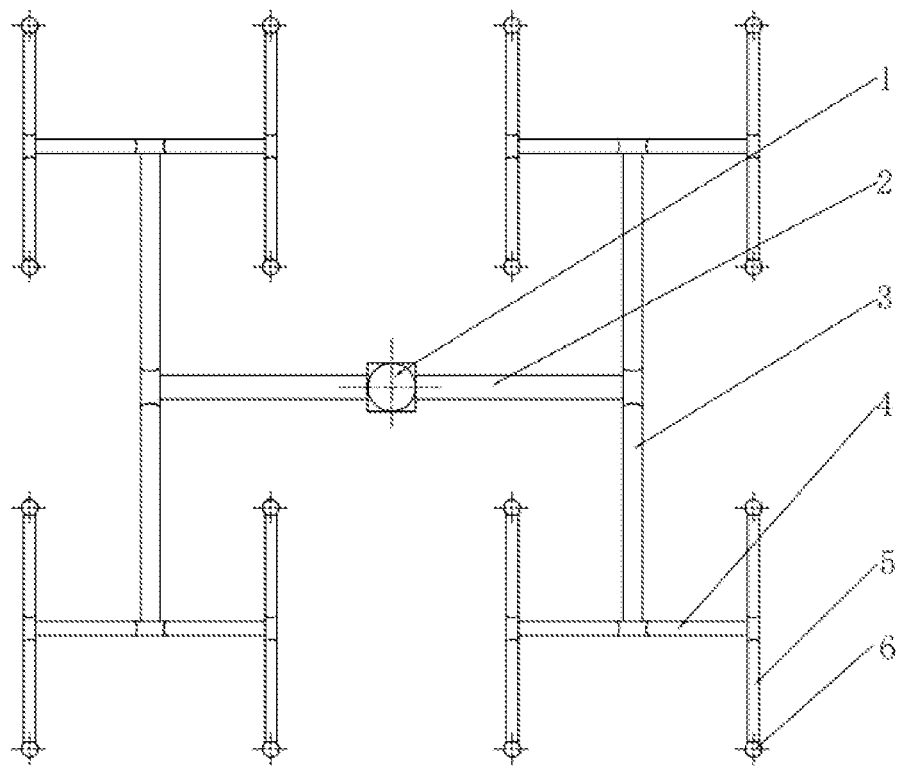
FIG. 2 is a vertical view of the plane-distributed load sharing pressure device.

In the drawings: 1—force applying member; 2—first-stage balance rod; 3—second-stage balance rod; 4—third-stage balance rod; 5—fourth-stage balance rod; 6—force bearing member.

DETAILED DESCRIPTION

In order to make the above-mentioned characteristics and advantages of the present disclosure more obvious and understandable, detailed description is made as below by giving embodiments with reference to the attached drawings hereafter. However, the present disclosure is not limited thereto.

Refer to FIG. 1 to FIG. 4

A plane-distributed load sharing pressure device includes a first-stage balance rod 2 to an Nth-stage balance rod, N≥2. The middle part of the first-stage balance rod is hinged to a force applying member 1. The two ends of the first-stage balance rod are respectively perpendicular to and hinged to the middle parts of second-stage balance rods 3. The two ends of the second-stage balance rod are respectively perpendicular to and hinged to the middle parts of third-stage balance rods 4. Similarly, the two ends of an (N−1)th-stage balance rod are respectively perpendicular to and hinged to the middle parts of Nth-stage balance rods. Force bearing members 6 used for resolving a force applied by the force applying member to target members are arranged at the two ends of the Nth-stage balance rod. Force applying directions of the force bearing members are the same as that of the force applying member.

In the present embodiment, the first-stage balance rod to the Nth-stage balance rod are separately equal armed levers.

A certain concentrated force acting on the force applying member 1 is resolved into two concentrated forces with a constant direction and half of magnitude of the original force by the first-stage balance rod 2. The resolved two concentrated forces are further resolved into four concentrated forces with a constant direction and a quarter of magnitude of the original force by two second-stage balance rods 3. Similarly, a concentrated force may be resolved as many times as necessary to obtain $2^n$ concentrated forces with a constant direction and $\frac{1}{2}^n$ of magnitude of the original force (n=1, 2, 3 . . . ). Finally, the forces are applied to the target members through the force bearing members 6. The acting points of these forces may be adjusted as required by the arm lengths of levers of various stages. The number of the balance rods may be determined according to the requirement of force bearing points.

In this way, a concentrated force may be uniformly distributed at a plurality of points of a force bearing surface. In addition, the directions of various force bearing points may be kept the same as that of an initial force bearing point, and the magnitude of the force is resolved averagely.

When N=4, the plane-distributed load sharing pressure device includes force bearing members, a first-stage balance rod, second-stage balance rods, third-stage balance rods, fourth-stage balance rods, and the like. The middle part of the first-stage balance rod is hinged to the force applying member which applies a force downward. The two ends of the first-stage balance rod are respectively perpendicular to and hinged to the second-stage balance rods. The two ends of the second-stage balance rod are respectively perpendicular to and hinged to the third-stage balance rods. The two ends of the third-stage balance rod are respectively perpendicular to and hinged to the fourth-stage balance rods 5. The force bearing members are arranged on the lower sides of the two ends of the fourth-stage balance rods, and the force bearing members are hinged to the fourth-stage balance rods.

Figure 3:
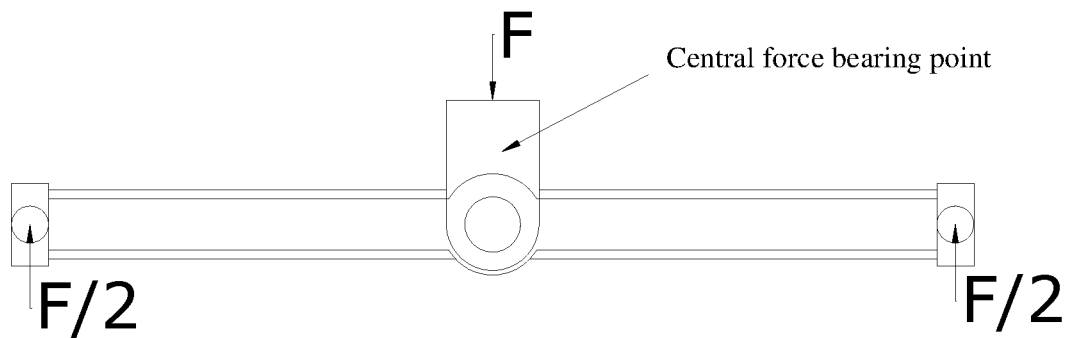
FIG. 3 is a schematic structural diagram of a force bearing state of a first-stage balance rod of the plane-distributed load sharing pressure device.

As shown in FIG. 3, when a central force bearing point of a mechanism is subjected to a downward force with the magnitude of F, because the central force bearing point is located at the center of a balance rod, the force is resolved into two forces F/2 with equal magnitude by the first-stage balance rod, and the two forces F/2 are distributed at the two ends of the balance rod.

Figure 4:
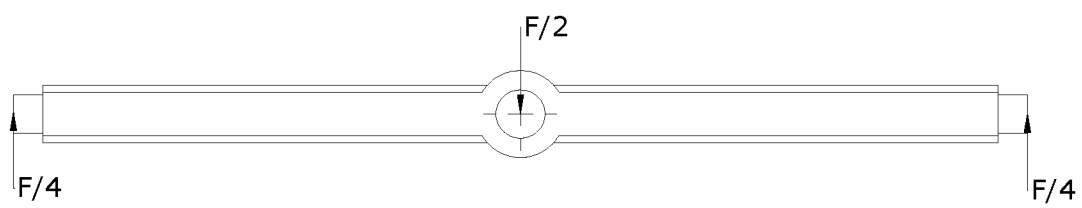
FIG. 4 is a schematic structural diagram of a force bearing state of a second-stage balance rod of the plane-distributed load sharing pressure device.

FIG. 4 shows a second-stage balance rod. The force bearing of the second-stage balance rods is similar to that of the first-stage balance rod, and the F/2 may be resolved into F/4. Similarly, the original concentrated force may be uniformly resolved into a plurality of component forces to apply to the target members. In actual application, the lengths of the balance rods of various stages may be adjusted according to a working condition requirement, and the lengths of the balance rods of the same stage may also be different. In this way, diverse force bearing point distribution requirements can be met flexibly.

A use method of the above-mentioned plane-distributed load sharing pressure device includes:

1) according to the requirement of force bearing points, selecting the number of balance rods;

2) adjusting the lengths of the balance rods of various stages according to the working condition requirement, and the lengths of the balance rods of the same stage may be different;

3) assembling the balance rods into the plane-distributed load sharing pressure device, hinging the middle part of a first-stage balance rod to a force applying member, and mounting force bearing members at the two ends of Nth-stage balance rods, so that the force bearing members act at the force bearing points.

Unless otherwise stated, if any above-mentioned technical solution disclosed in the present disclosure discloses numerical ranges, then the disclosed numerical ranges are all preferred numerical ranges. Any person skilled in the art should understand that: the preferred numerical ranges are only the numerical values with obvious technical effect or representativeness among many implementable values. The numerical values are too many to be exhaustive, so part of the numerical values are disclosed by the present disclosure to illustrate the technical solution of the present disclosure. In addition, the numerical values listed above shall not constitute a limitation to the scope of protection of the present disclosure.

If the words "first", "second", and the like are used to limit components and parts herein, the person skilled in the art should be aware that: the use of "first" and "second" is only intended to facilitate distinguishing the components and parts descriptively. Unless otherwise stated, the above-mentioned words do not have special meanings.

A "hinged" manner in the present disclosure may be a sliding bearing, a rolling bearing, or simple shaft hole fit. In addition, in order to meet diverse requirements of force bearing point distribution, adjacent balance rods may be non-perpendicular, that is, designed in an inclined state.

In addition, unless otherwise stated, the meanings of the terms used for indicating positional relationships or shapes applied to any technical solution disclosed by the present disclosure include the states or shapes approximate to, similar to, or close to them.

Any part provided by the present disclosure may be either assembled by a plurality of separate parts or manufactured as a single part by an integrated forming process.

The above description is only a preferred embodiment of the present disclosure. For a person of ordinary skill in the art, different forms of plane-distributed load sharing pressure devices are designed without creative efforts according to the teaching of the present disclosure. All equivalent changes, modifications, substitutions, and variations made in accordance with the scope of the patent application of the present disclosure without departing from the principle and spirit of the present disclosure shall fall within the scope of the present disclosure.

What is claimed is:

1. A plane-distributed load sharing pressure device, comprising
   a first-stage balance rod to N-stage balance rods, N≥2, the N-stage balance rods comprising,
     second-stage balance rods,
     third-stage balance rods,
     (N−1)th-stage balance rods; and
     Nth-stage balance rods
   a force applying member; and
   force bearing members
   wherein a middle part of the first-stage balance rod is hinged to the force applying member; two ends of the first-stage balance rod are respectively perpendicular to and hinged to middle parts of the second-stage balance rods; two ends of the each of the second-stage balance rods are respectively perpendicular to and hinged to middle parts of corresponding two of the third-stage balance rods; similarly, two ends of the (N−1)th-stage balance rods are respectively perpendicular to and hinged to middle parts of corresponding two of the Nth-stage balance rods; each force bearing member of the force bearing members used for resolving a force applied by the force applying member to target members is arranged at a respective one of the two ends of a corresponding one of the Nth-stage balance rods; wherein the N-stage balance rods are configured to resolve the force applied by the force applying member to obtain $2^n$ concentrated forces with a constant direction; the force bearing members have a same force applying direction as the force applying member.

2. The plane-distributed load sharing pressure device according to claim 1, wherein the first-stage balance rod to the Nth-stage balance rod are separately equal armed levers.

3. The plane-distributed load sharing pressure device according to claim 2, wherein when N=4, the N-stage balance rods comprise fourth-stage balance rods; the middle part of the first-stage balance rod is hinged to the force applying member which applies a force downward; the two ends of the first-stage balance rod are respectively perpendicular to and hinged to the second-stage balance rods; the two ends of each of the second-stage balance rods are respectively perpendicular to and hinged to the corresponding two of the third-stage balance rods; the two ends of each of the third-stage balance rods are respectively perpendicular to and hinged to corresponding two of the fourth-stage balance rods; each force bearing member is arranged on a lower side of the respective one of the two ends of the fourth-stage balance rods.

4. A use method applied to the plane-distributed load sharing pressure device according to claim 2, comprising the following steps:
1) according to a requirement of force bearing points, selecting a number of the N-stage balance rods;
2) adjusting lengths of the N-stage balance rods, and lengths of one of the N-stage balance rods which are same stage balance rods are different;
3) assembling the N-stage balance rods into the plane-distributed load sharing pressure device, hinging the middle part of the first-stage balance rod to the force applying member, and mounting each force bearing member at the respective one of the two ends of the corresponding one of Nth-stage balance rods, so that the force bearing members act at the force bearing points.

5. The plane-distributed load sharing pressure device according to claim 1, wherein when N=4, the N-stage balance rods comprise fourth-stage balance rods; the middle part of the first-stage balance rod is hinged to the force applying member which applies a force downward; the two ends of the first-stage balance rod are respectively perpendicular to and hinged to the second-stage balance rods; the two ends of each of the second-stage balance rods are respectively perpendicular to and hinged to the corresponding two of the third-stage balance rods; the two ends of each of the third-stage balance rods are respectively perpendicular to and hinged to corresponding two of the fourth-stage balance rods; each of the force bearing members is arranged on a lower side of the respective one of the two ends of the corresponding one of the fourth-stage balance rods.

6. A use method applied to the plane-distributed load sharing pressure device according to claim 1, comprising the following steps:
1) according to a requirement of force bearing points, selecting a number of the N-stage balance rods;
2) adjusting lengths of the N-stage balance rods, and lengths of one of the N-stage balance rods which are the same stage balance rods are different;
3) assembling the N-stage balance rods into the plane-distributed load sharing pressure device, hinging the middle part of the first-stage balance rod to the force applying member, and mounting each force bearing member at the respective one of the two ends of the corresponding one of the Nth-stage balance rods, so that the force bearing members act at the force bearing points.

\* \* \* \* \*